United States Patent
Tanabe et al.

(10) Patent No.: US 10,665,076 B2
(45) Date of Patent: May 26, 2020

(54) MOBILE ELECTRONIC DEVICE, CONTROL SYSTEM, CONTROL METHOD, AND NON-TRANSITORY COMPUTER READABLE STORAGE MEDIUM

(71) Applicant: KYOCERA Corporation, Kyoto (JP)

(72) Inventors: Shigeki Tanabe, Yokohama (JP); Hideki Morita, Yokohama (JP); Isao Masuike, Machida (JP); Shinya Saito, Kawasaki (JP); Tetsushi Wakasa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/191,576

(22) Filed: Nov. 15, 2018

(65) Prior Publication Data

US 2019/0080582 A1   Mar. 14, 2019

Related U.S. Application Data

(63) Continuation of application No. PCT/JP2017/019701, filed on May 26, 2017.

(30) Foreign Application Priority Data

May 27, 2016   (JP) .................. 2016-106205

(51) Int. Cl.
*G08B 21/02*   (2006.01)
*G08G 1/09*   (2006.01)
(Continued)

(52) U.S. Cl.
CPC ............. *G08B 21/02* (2013.01); *G08B 21/24* (2013.01); *G08G 1/005* (2013.01); *G08G 1/09* (2013.01); *H04M 1/00* (2013.01); *H04W 4/029* (2018.02); *H04W 4/80* (2018.02); *H04W 68/00* (2013.01); *H04W 4/90* (2018.02)

(58) Field of Classification Search
CPC ....... H04W 4/029; H04W 4/80; H04W 68/00; G08B 21/02; G08B 21/24; H04M 1/00; G08G 1/005; G08G 1/09
See application file for complete search history.

(56) References Cited

U.S. PATENT DOCUMENTS

| 2009/0224932 A1* | 9/2009 | Kilim | A61H 3/061 |
| | | | 340/686.6 |
| 2013/0069799 A1* | 3/2013 | Ma | G08G 1/07 |
| | | | 340/907 |

(Continued)

FOREIGN PATENT DOCUMENTS

| JP | 2009-267770 A | 11/2009 |
| JP | 2012-113424 A | 6/2012 |

(Continued)

*Primary Examiner* — Mehmood B. Khan
(74) *Attorney, Agent, or Firm* — Studebaker & Brackett PC (57) ABSTRACT

A mobile electronic device comprises at least one processor. The at least one processor specifies a position of a user based on the first information. Upon determining that the user is located in a region through which the user is prohibited from passing based on the position of the user and signal information which a roadside unit transmits using short-range wireless communication, the at least one processor executes setting processing for transmitting a notification of a state of the user.

10 Claims, 6 Drawing Sheets

(51) Int. Cl.
*G08B 21/24* (2006.01)
*H04M 1/00* (2006.01)
*G08G 1/005* (2006.01)
*H04W 4/029* (2018.01)
*H04W 4/80* (2018.01)
*H04W 68/00* (2009.01)
*H04W 4/90* (2018.01)

(56) References Cited

U.S. PATENT DOCUMENTS

| | | | | |
|---|---|---|---|---|
| 2015/0084791 A1* | 3/2015 | Jang | ............... | G08G 1/07 |
| | | | | 340/944 |
| 2016/0110998 A1* | 4/2016 | Todasco | ............. | G08C 17/02 |
| | | | | 340/944 |
| 2016/0148513 A1* | 5/2016 | Beaurepaire | ...... | G08G 1/164 |
| | | | | 701/117 |
| 2016/0151231 A1* | 6/2016 | Villar Cloquell | .... | G09B 21/001 |
| | | | | 340/944 |
| 2016/0155334 A1* | 6/2016 | Jansson | ............. | G08G 1/164 |
| | | | | 340/906 |
| 2017/0252256 A1* | 9/2017 | Henshue | ............ | A61H 3/061 |
| 2017/0334459 A1* | 11/2017 | McNew | ............. | B60W 50/14 |

FOREIGN PATENT DOCUMENTS

| | | | |
|---|---|---|---|
| JP | 2012-251948 A | | 12/2012 |
| JP | 2013-097387 A | | 5/2013 |
| JP | 2013097387 A | * | 5/2013 |
| JP | 2015-184834 A | | 10/2015 |
| JP | 2015184834 A | * | 10/2015 |
| JP | 2015-219641 A | | 12/2015 |
| JP | 2015219641 A | * | 12/2015 |

* cited by examiner

MOBILE ELECTRONIC DEVICE, CONTROL SYSTEM, CONTROL METHOD, AND NON-TRANSITORY COMPUTER READABLE STORAGE MEDIUM

CROSS-REFERENCE TO RELATED APPLICATION

The present application is a continuation based on PCT Application No. PCT/JP2017/019701 filed on May 26, 2017, which claims the benefit of Japanese Application No. 2016-106205, filed May 27, 2016. PCT Application No. PCT/JP2017/019701 is entitled "PORTABLE ELECTRONIC DEVICE, CONTROL SYSTEM, CONTROL METHOD, AND CONTROL PROGRAM", and Japanese Application No. 2016-106205 is entitled "MOBILE ELECTRONIC APPARATUS, CONTROL SYSTEM, MOBILE ELECTRONIC APPARATUS CONTROL METHOD, AND MOBILE ELECTRONIC APPARATUS CONTROL PROGRAM". The contents of which are incorporated by reference herein in their entirety.

FIELD

Embodiments of the present disclosure relate to mobile electronic devices.

BACKGROUND

There is conventionally a mobile electronic device of a mobile communication device capable of determining whether a user is moving.

SUMMARY

In one embodiment, a mobile electronic device comprises at least one processor. The at least one processor specifies a position of a user based on the first information. Upon determining that the user is located in a region through which the user is prohibited from passing based on the position of the user and signal information which a roadside unit transmits using short-range wireless communication, the at least one processor executes setting processing for transmitting a notification of a state of the user.

In one embodiment, a control method is a control method of controlling a mobile electronic device. The control method comprises: obtaining first information and obtaining signal information via short-range wireless communication with a roadside unit; and specifying a position of a user based on the first information, and upon determining that the user is located in a region through which the user is prohibited from passing based on the position of the user and the signal information, executing setting processing for transmitting a notification of a state of the user.

In one embodiment, a non-transitory computer readable storage medium that stores a control program. The control program makes a mobile electronic device execute: obtaining first information and obtaining signal information via short-range wireless communication with a roadside unit: and specifying a position of a user based on the first information, and upon determining that the user is located in a region through which the user is prohibited from passing based on the position of the user and the signal information, executing setting processing for transmitting a notification of a state of the user.

DETAILED DESCRIPTION

A plurality of embodiments according to the present disclosure will be described in detail with reference to the drawings. A smartphone is described as one example of the mobile electronic device hereinafter.

Figure 1:
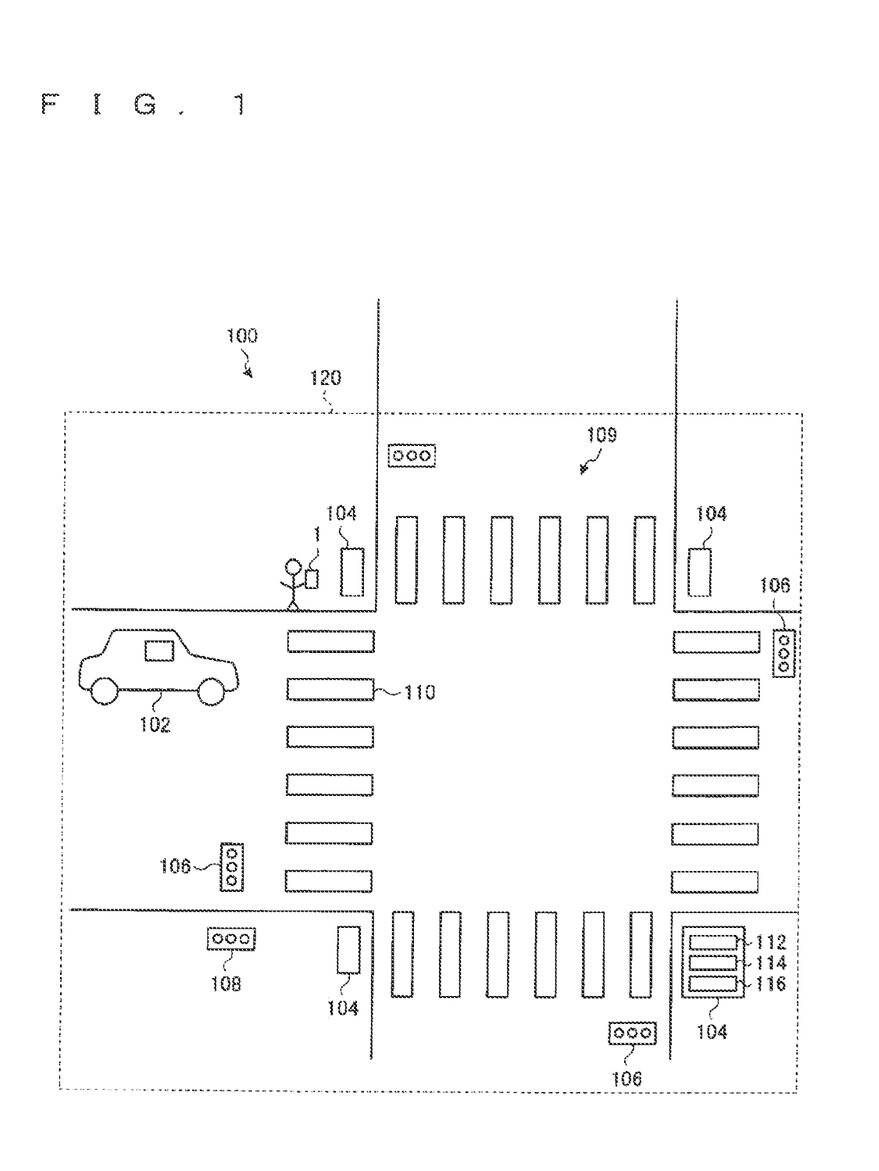
FIG. 1 illustrates a schematic diagram showing a configuration of one example of a control system.

A schematic configuration of a control system 100 comprising a smartphone 1 is described. FIG. 1 is a schematic diagram showing a configuration of one example of a control system. The control system 100 comprises the smartphone 1 and a roadside unit 104. The control system 100 comprises a large number of smartphones 1 and a large number of roadside units 104, for example. The control system 100 comprises various communication devices which communicate with the smartphone 1 to transmit information regarding state around the smartphone 1 to the smartphone 1. FIG. 1 shows one smartphone 1 and four roadside units 104 located in one intersection.

The roadside unit 104 controls displays of a traffic light 106 and a traffic light 108. The traffic light 106 and the traffic light 108 are disposed in an intersection 109. A crosswalk 110 is located in the intersection 109. The crosswalk 110 is located on a road along which a vehicle passes. The traffic light 106 is provided for a vehicle 102. The traffic light 106 is disposed on each road in the intersection 109. The traffic light 106 indicates whether a road on which the traffic light 106 is disposed is in a state of being passable or impassable. The traffic light 108 is provided for a pedestrian crossing the crosswalk 110. The traffic light 108 is disposed on each crosswalk 110 in the intersection 109. The traffic light 108 indicates whether the crosswalk 110 on which the traffic light 108 is disposed is in a state of being passable or impassable. The intersection 109 may not include the crosswalk 110.

The roadside unit 104 comprises a communication unit 112, a controller 114, and a storage 116. The communication unit 112 can perform a wireless communication. A communication system supported by the communication unit 112 is a wireless communication standard, for example. Examples of the wireless communication standard include, for example, Worldwide Interoperability for Microwave Access (WiMAX), IEEE802.11, Bluetooth (trademark), Infrared Data Association (IrDA), and Near Field Communication (NFC). The wireless communication standard further includes, for example, a communication standard for a cellular phone, such as 2G, 3G, and 4G. Examples of the communication standard for a cellular phone include Long Term Evolution (LTE), Wideband Code Division Multiple Access (W-CDMA), CDMA2000, Personal Digital Cellular (PDC), Global System for Mobile Communications (GSM) (trademark), and Personal Handy-phone System (PHS). The communication unit 112 may support a single or a plurality of the communication standards described above. The communication unit 112 may support a wire communication.

The wire communication includes, for example, Ethernet (trademark) and fiber channel. The communication unit 112 communicates with the other roadside unit 104, the traffic light 106, and the traffic light 108, and outputs signals of controlling the displays of the traffic lights 106 and 108. The communication unit 112 communicates with a communication device located in a predetermined region 120 via short-range wireless communication to transmit and receive data to and from the communication device. The communication device includes a communication device mounted on the vehicle 102 and the smartphone 1.

The controller 114 includes at least one processor for providing control and processing capability to execute various functions as described in detail below.

In accordance with various embodiments, the at least one processor may be executed as a single integrated circuit (IC) or as multiple communicatively coupled IC's and/or discrete circuits. The at least one processor can be executed in accordance with various known techniques.

In one embodiment, the processor includes one or more circuits or units configurable to perform one or more data computing procedures or processes by executing instructions stored in an associated memory, for example. In the other embodiment, the processor may be firmware configurable to perform one or more data computing procedures or processes (a discrete logic component, for example).

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described below.

The controller 114 includes an arithmetic processing unit, for example. The arithmetic processing unit includes, but not only limited to, a central processing unit (CPU), a system-on-a-chip (SoC), a micro control unit (MCU), and a field-programmable gate array (FPGA), for example. The controller 114 integrally controls the operation of the roadside unit 104 so as to achieve the various functions.

The controller 114 executes a command included in a program stored in the storage 116 with reference to the data stored in the storage 116 as necessary. Then, the controller 114 controls the function unit in accordance with the data and the command, thereby achieving the various functions.

The storage 116 can store a program and data. The storage 116 is also used as a workspace in which a processing result of the controller 114 is temporarily stored. The storage 116 may include any non-transitory storage medium such as a semiconductor storage medium and a magnetic storage medium. The storage 116 may include a plural types of storage media. The storage 116 may include a combination of a transportable storage medium such as a memory card, an optical disc, and a magneto-optical disk and a reader for the storage medium. The storage 116 may include a storage device used as such as random access memory (RAM) that is used as a temporary storage area.

The program stored in the storage 116 includes a program for executing a display control of the traffic light 106 and the traffic light 108. The program stored in the storage 116 includes a program for executing communication establishment processing and control of a transmission and reception of the data between the communication device in a predetermined range and the roadside unit 104. The data stored in the storage 116 includes reference data for controlling the displays of the traffic light 106 and the traffic light 108 disposed in each position and data transmitted to another communication device.

The roadside unit 104 communicates with the other roadside unit 104 disposed in the intersection 109 to control the displays of the traffic light 106 and the traffic light 108 located in the intersection 109. Specifically, the roadside unit 104 makes the traffic light 106 and the traffic light 108 located on one of the roads intersecting with each other display a passable state, and makes the traffic light 106 and the traffic light 108 located on the other one of the roads intersecting with each other display an impassable state. After an elapse of a predetermined time of this state, the roadside unit 104 makes the traffic light 106 and the traffic light 108 located on both the roads intersecting with each other display the impassable state, and subsequently makes the traffic light 106 and the traffic light 108 located on one of the roads intersecting with each other display the impassable state and makes the traffic light 106 and the traffic light 108 located on the other one of the roads intersecting with each other display the passable state. The roadside unit 104 limits the vehicle 102 and a person which can pass through the intersection 109, and suppresses an occurrence of an accident in the intersection 109, The roadside unit 104 can also control the traffic light 106 for the vehicle and the traffic light 108 for the pedestrian separately to set a state where only the pedestrian can pass through the intersection and a state where only the vehicle can pass through the intersection.

Figure 2:
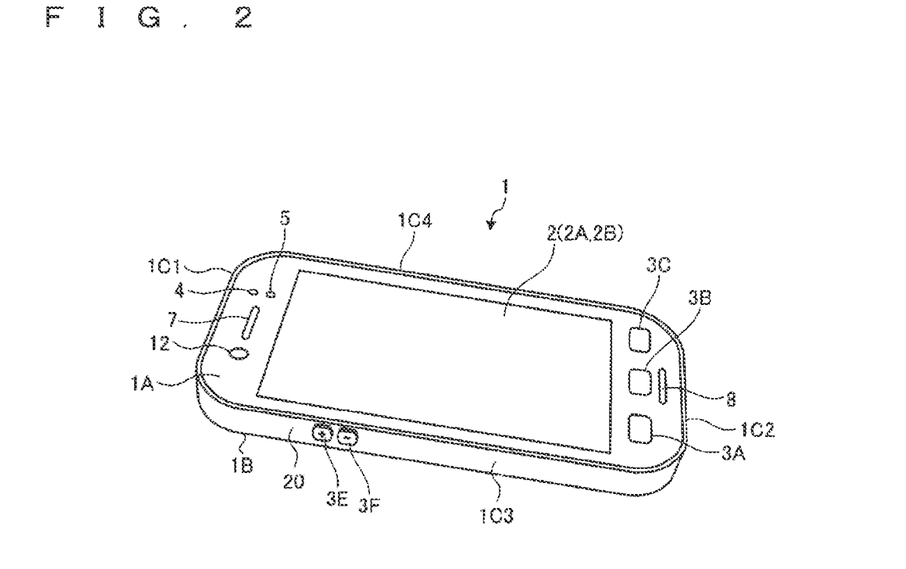
FIG. 2 illustrates a perspective view of one example of a smartphone.
Figure 3:
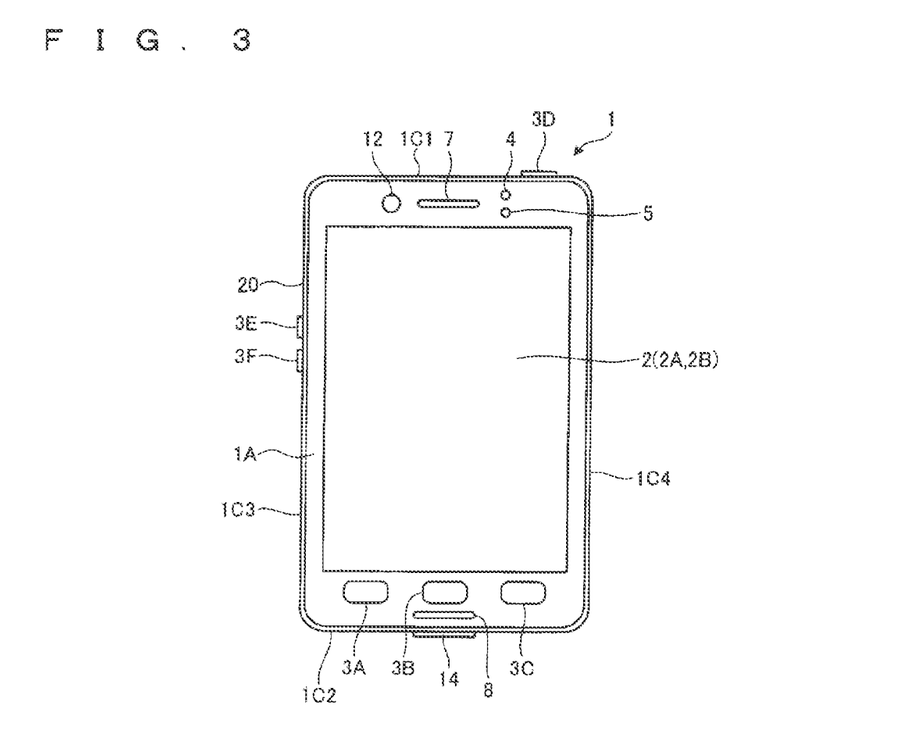
FIG. 3 illustrates a front view of one example of the smartphone.
Figure 4:
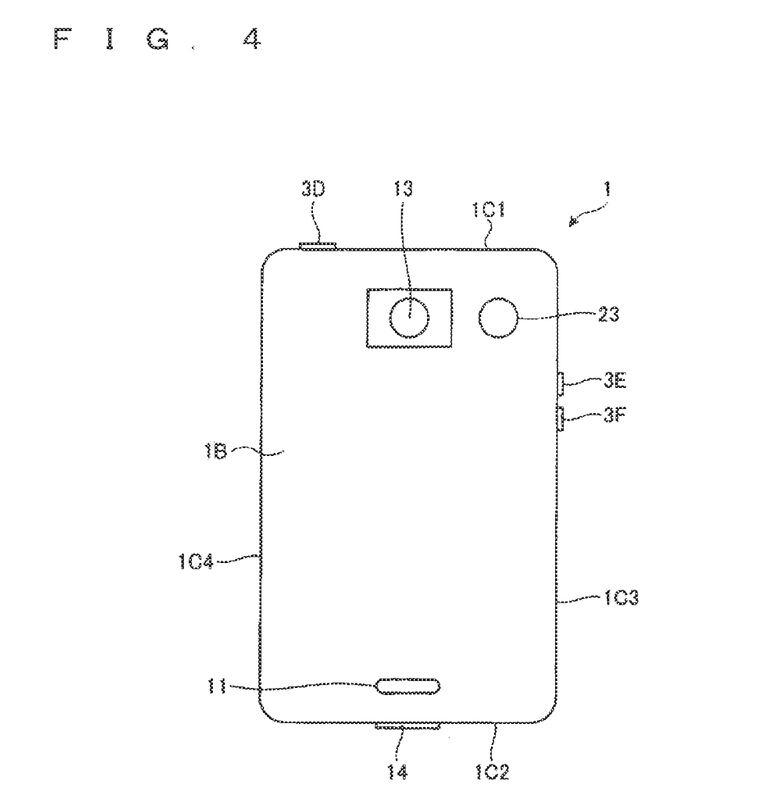
FIG. 4 illustrates a back view of one example of the smartphone.

A whole configuration of the smartphone 1 according to one embodiment is described with reference to FIG. 2 to FIG. 4. As shown in FIG. 2 to FIG. 4, the smartphone 1 comprises a housing 20, The housing 20 comprises a front face 1A, a back face 1B, and side faces 1C1 to 1C4. The front face 1A is a front surface of the housing 20. The hack face 1B is a back surface of the housing 20. The side faces 1C1 to 1C4 are side surfaces connecting the front face 1A and the back face 1B. The side faces 1C1 to 1C4 may not be specified but be collectively referred to as the side face 1C in some cases hereinafter.

The smartphone 1 comprises, in the front face 1A, a touchscreen display 2, buttons 3A to 3C, an illuminance sensor 4, a proximity sensor 5, a receiver 7, a microphone 8, and a camera 12. The smartphone 1 comprises, in the back face 1B, a speaker 11, a camera 13, and a light emitting unit 23, The smartphone 1 comprises buttons 3D to 3F and a connector 14 in the side face 1C. The buttons 3A to 3F may not be specified but be collectively referred to as the button 3 in some cases hereinafter.

The touchscreen display 2 comprises a display 2A and a touchscreen 2B. In the example in FIG. 2, each of the display 2A and the touchscreen 2B has a substantially rectangular shape, however, the shape of each of the display 2A and the touchscreen 2B is not limited thereto. Each of the display 2A and the touchscreen 2B may have any shape such as a square shape or a circular shape. In the example in FIG. 2, the display 2A and the touchscreen 2B are located to overlap with each other, however, the position of the display 2A and the touchscreen 29 is not limited thereto. The display 2A and the touchscreen 29 may be located side by side or separately located, for example. In the example in FIG. 2, a long side of the display 2A is located along a long side of the touchscreen 2B, and a short side of the display 2A is located along a short side of the touchscreen 2B, however, a form of overlapping the display 2A with the touchscreen 2B is not limited thereto. If the display 2A and the touchscreen 2B are located to overlap with each other, one or a plurality of sides of the display 2A may not be located along any side of the touchscreen 2B.

The display 2A includes a display device of a liquid crystal display (LCD), an organic electro-luminescence display (OEM), or an inorganic electro-luminescence display (IELD), for example. The display 2A can display an object such as characters, images, symbols, and graphics, for example.

The touchscreen 2B can detect a contact of a finger, a pen, or a stylus pen, for example, with the touchscreen 2B. The touchscreen 2B can detect a position in the touchscreen 2B where a plurality of fingers, the pen, or the stylus pen, for example, comes in contact.

A detection method of the touchscreen 2B may be any method, such as an electrostatic capacitance method, a resistance film method, a surface acoustic wave method, an infrared method, and a load detection method. The description below is based on an assumption that a user comes in contact with the touchscreen 2B using his/her finger to operate the smartphone 1 for ease of description.

The smartphone 1 distinguishes types of gesture based on at least one of a contact detected by the touchscreen 2B, a position where the contact is detected, a change in the position where the contact is detected, an interval of detections of contact, and a total number of times of detection of contact. The gesture is an operation performed on the touchscreen 2B. Examples of the gesture determined by the smartphone 1 include, but not only limited to, touch, long touch, release, swipe, tap, double tap, long tap, drag, flick, pinch-in, and pinch-out.

Figure 5:
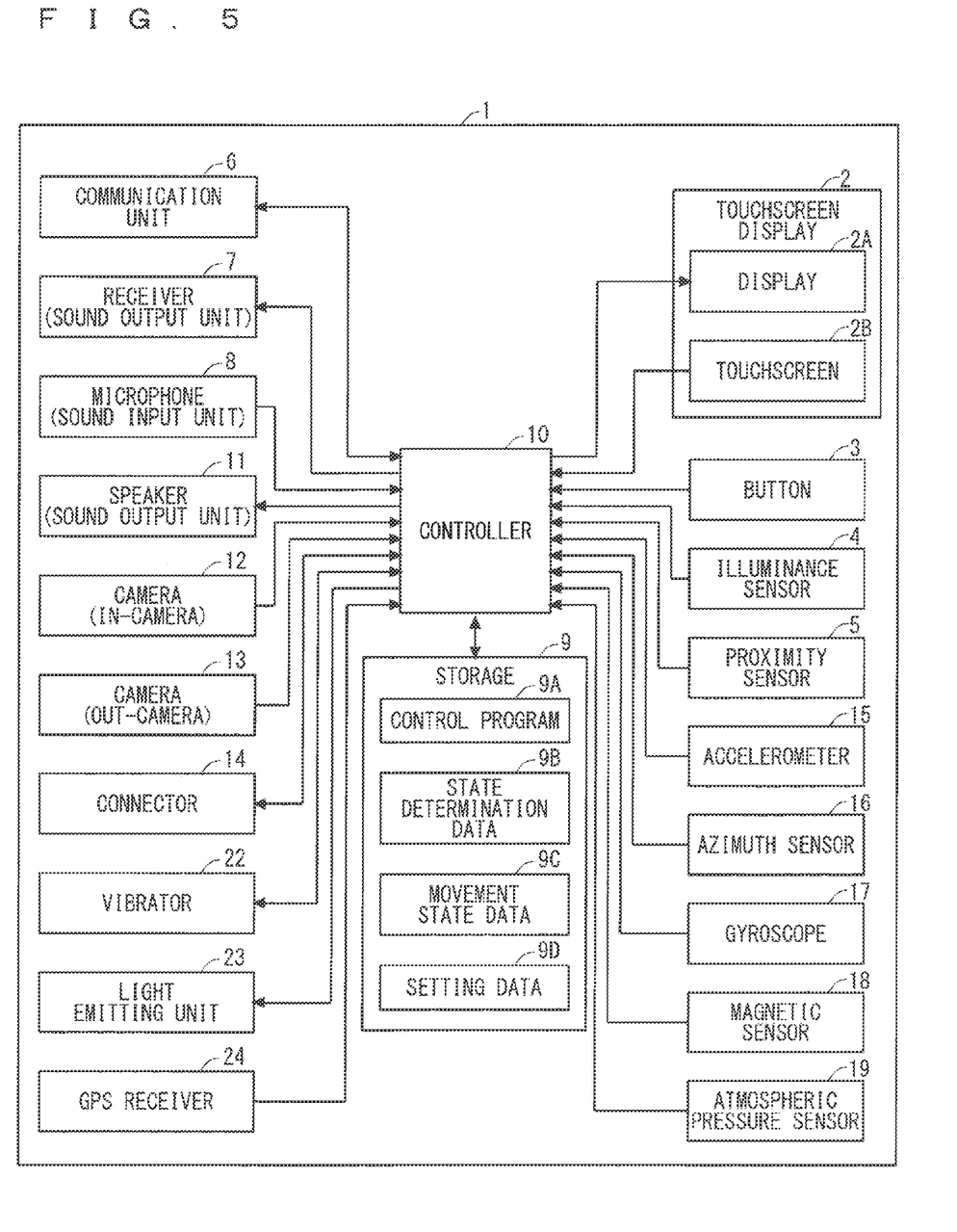
FIG. 5 illustrates a block diagram of one example of the smartphone.

FIG. 5 is a block diagram of the smartphone 1. The smartphone 1 comprises a touchscreen display 2, a button 3, the illuminance sensor 4, the proximity sensor 5, a communication unit 6, the receiver (sound output unit) 7, the microphone (sound input unit) 8, a storage 9, a controller 10, the speaker 11, the cameras 12 and 13, the connector 14, an accelerometer 15, an azimuth sensor 16, a gyroscope 17, a magnetic sensor 18, an atmospheric pressure sensor 19, a vibrator 22, the light emitting unit 23, and a GPS receiver 24. The smartphone 1 may comprise a receiver for radio signals emitted from positioning artificial satellites other than GPS satellites as substitute for or complementary to the GPS receiver 24. The positioning artificial satellites other than the GPS satellites include, for example, artificial satellites of global navigation satellite system (GLONASS), artificial satellites of indian regional navigational satellite system (IRNSS), artificial satellites of COMPASS, and artificial satellites of GALILEO.

The touchscreen display 2 comprises the display 2A and the touchscreen 2B as described above. The display 2A can display characters, images, symbols, or graphics, for example. The touchscreen 2B can detect contact. The controller 10 can detect a gesture performed on the smartphone 1. Specifically, the controller 10 cooperates with the touchscreen 2B, thereby being able to detect an operation (gesture) performed on the touchscreen 2B (touchscreen display 2).

The user operates the button 3. The button 3 has buttons 3A to 3F. The controller 10 cooperates with the button 3, thereby being able to detect an operation performed on the button 3. Examples of the operation performed on the button 3 include, but not only limited to, click, double click, triple click, push, and multi push.

Each of the buttons 3A to 3C is a home button, a back button, or a menu button, for example. The button 3D is a power on/off button of the smartphone 1, for example. The button 3D may double as a sleep/sleep-cancel button. The buttons 3E and 3F are volume buttons, for example.

The illuminance sensor 4 can detect illuminance of light around the smartphone 1. The illuminance indicates intensity, brightness, or luminance of light. The illuminance sensor 4 is used for adjusting luminance of the display 2A, for example. The proximity sensor 5 can detect a presence of an object near the proximity sensor 5 in a non-contact manner. The proximity sensor 5 can detect the presence of the object based on a change in a magnetic field or a change in a returning time period of a reflected wave of an ultrasonic wave. The proximity sensor 5 can detect, for example, a face approaching the touchscreen display 2. The illuminance sensor 4 and the proximity sensor 5 may be made up as one sensor. The illuminance sensor 4 may be used as the proximity sensor.

The communication unit 6 can perform a wireless communication. The communication unit 6 according to one embodiment comprises at least a function of a short-range wireless communication. A communication system supported by the communication unit 6 is a wireless communication standard. The wireless communication standard includes, for example, a communication standard for a cellular phone, such as 2G, 3G, 4G, 5G. Examples of the communication standard for a cellular phone include Long Term Evolution (LIE), Wideband Code Division Multiple Access (W-CDMA), CDMA2000, Personal Digital Cellular (PDC), Global System for Mobile Communications (GSM) (trademark), and Personal Handy-phone System (PHS). Examples of the wireless communication standard further include, for example, Worldwide Interoperability for Microwave Access (WiMAX), IEEE802.11 (including b, n, and p), Bluetooth (trademark), infrared Data Association (IrDA), and Near Field Communication (INK), The communication unit 6 may support a single or a plurality of the communication standards described above. The communication unit 6 may support a wire communication. The wire communication includes, for example, Ethernet (trademark) and fiber channel. In one embodiment, the communication unit 6 may support a communication standard for enabling a communication with a roadside unit disposed on the side of a road. For example, the smartphone 1 may communicate with the roadside unit via the communication unit 6, thereby obtaining information of intelligent transport system. In one embodiment, the communication unit 6 may support a communication standard for enabling a communication with a communication device mounted on a vehicle. For example, the smartphone 1 may communicate with the vehicle via the communication unit 6, thereby obtaining information of the vehicle.

The receiver 7 and the speaker 11 are sound output units. The receiver 7 and the speaker 11 can output a sound signal transmitted from the controller 10 as a sound. The receiver 7 is used for outputting a voice of an intended party during a voice communication. The speaker 11 is used for outputting a ringtone and music, for example. One of the receiver 7 and the speaker 11 may doubles as the other's function. The microphone 8 is a sound input unit. The microphone 8 can convert, for example, a voice of the user into a sound signal and transmit the sound signal to the controller 10.

The storage 9 can store a program and data. The storage 9 is also used as a workspace in which a processing result of the controller 10 is temporarily stored. The storage 9 may include any non-transitory storage medium such as a semi-conductor storage medium and a magnetic storage medium. The storage 9 may include a plural types of storage media. The storage 9 may include a combination of a transportable storage medium such as a memory card, an optical disc, and a magneto-optical disk and a reader for the storage medium. The storage 9 may include a storage device used as such as random access memory (RAM) that is used as a temporary storage area.

The program stored in the storage 9 includes an application executed in foreground or background and a control program assisting an operation of the application. The application makes the display 2A display a screen, and makes the controller 10 execute processing in accordance with a gesture detected via the touchscreen 2B. The control program includes OS, for example. The application and the control program may be installed in the storage 9 via the communication performed by the communication unit 6 or via a non-transitory storage medium.

The storage 9 stores a control program 9A, state determination data 9B, movement state data 9C, and setting data 9D, for example. The state determination data 9B includes information of determining a state of a surrounding area based on information detected by the various sensors and information regarding processing executed by the smartphone 1 based on information of the surrounding area. The state determination data 9B stores reference data for determining whether or not there is a user in a predetermined region which is a region where predetermined processing is executed. Specifically, if the smartphone 1 establishes the communication with the roadside unit, the state determination unit 9B stores data for determining that there is the smartphone 1 in the predetermined region. The state determination data 9B stores data for determining a passable region and an impassable region based on information obtained from the roadside unit. The movement state data 9C includes information used for estimating a moving method of the user. The movement state data 9C stores a relationship between a detection result of the sensor which has been detected by a test or a simulation in advance and the moving method. The movement state data 9C according to one embodiment stores reference data for determining whether or not a user walks. The setting data 9D includes information regarding various types of settings regarding the operation of the smartphone 1.

The control program 9A provides functions regarding various types of control to activate the smartphone 1. The control program 9A controls the communication unit 6, the receiver 7, and the microphone 8, for example, thereby achieving a voice communication. The functions provided by the control program 9A include a function of controlling information displayed on the display 2A. The functions provided by the control program 9A include a function of performing various types of control such as changing information displayed on the display 2A in accordance with a gesture detected via the touchscreen 2B. The function provided by the control program 9A may be used in combination with a function such as a mail application provided by the other program.

The controller 10 includes at least one processor for providing control and processing capability to execute various functions as described in detail below.

In accordance with various embodiments, the at least one processor may be executed as a single integrated circuit (IC) or as multiple communicatively coupled IC's and/or discrete circuits. The at least one processor can be executed in accordance with various known techniques.

In one embodiment, the processor includes one or more circuits or units configurable to perform one or more data computing procedures or processes by executing instructions stored in an associated memory, for example. In the other embodiment, the processor may be firmware configurable to perform one or more data computing procedures or processes (a discrete logic component, for example).

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described below.

The controller 10 comprises an arithmetic processing unit, for example. The arithmetic processing unit includes, but not only limited to, a central processing unit (CPU), a system-on-a-chip (SoC), a micro control unit (MCU), and a field-programmable gate array (FPGA), for example. The controller 10 integrally controls the operation of the smartphone 1 so as to achieve the various functions.

The controller 10 can execute a command included in a program stored in the storage 9 with reference to the data stored in the storage 9 as necessary. Then, the controller 10 controls the function unit in accordance with the data and the command, thereby achieving the various functions. The function unit may include at least one of the display 2A, the communication unit 6, the receiver 7, and the speaker 11, for example, but is not limited thereto. The controller 10 may change the control in accordance with the detection result of a detector in some cases. The detector comprises, but not only limited to, the touchscreen 2B, the button 3, the illuminance sensor 4, the proximity sensor 5, the microphone 8, the camera 12, the camera 13, the accelerometer 15, the azimuth sensor 16, the gyroscope 17, the magnetic sensor 18, and the atmospheric pressure sensor 19, for example.

The controller 10 executes the control program 9A, for example, thereby being able to execute the various types of control such as changing information displayed on the display 2A in accordance with the gesture detected via the touchscreen 2B.

The camera 12 is an in-camera capable of taking an image of an object facing the front face 1A. The camera 13 is an out-camera capable of taking an image of an object facing the back face 1B.

The connector 14 is a terminal to which the other device is connected. The connector 14 may be a general terminal such as Universal Serial Bus (USB), High-Definition Multimedia Interface (HDMI) (trademark), Light Peak (Thunderbolt (trademark)), and an earphone-microphone connector. The connector 14 may be a dedicated terminal such as a dock connector. Examples of a device to be connected to the connector 14 include, but not only limited to, an external storage, a speaker, and a communication device.

The accelerometer 15 can detect a direction and a magnitude of acceleration acting on the smartphone 1. The azimuth sensor 16 can detect information indicating a direction of earth magnetism. The gyro sensor 17 can detect information of an angle and an angular speed of the smartphone 1. The magnetic sensor 18 can detect information of magnetic attraction around the smartphone 1. The atmospheric pressure sensor 19 can detect information of atmospheric pressure (barometric pressure) outside the smartphone 1. The atmospheric pressure sensor 19 is located inside the housing 20. The atmospheric pressures inside and outside the housing 20 are coordinated with each other by a hole through which water does not pass but air passes. Accordingly, the atmospheric pressure sensor 19 can detect the atmospheric pressure outside the smartphone 1 in a state of being located inside. The detection results of the accelerometer 15, the azimuth sensor 16, and the gyroscope 17 are used in combination with each other to detect a change in a position and a posture of the smartphone 1, for example.

The vibrator 22 can vibrate the housing 20. The vibrator 22 comprises, for example, a piezoelectric element or an eccentric motor to generate vibration. The light emitting unit 23 is disposed in the back face 1B, and can emit light. The light emitting unit 23 is a lighting used at a time of taking an image with the camera 13 and a lighting illuminating an area around the smartphone 1.

The GPS receiver 24 can receive radio signals having a predetermined frequency band from a GPS satellite. The GPS receiver 24 can perform demodulation processing on the received radio signal, and can send out the processed signal to the controller 10. The GPS receiver 24 supports arithmetic processing of current position of the smartphone 1. A receiver of radio signals from a positioning artificial satellite other than the GPS satellite may support arithmetic processing of current position of the smartphone 1.

In FIG. 5, a part or all of the programs and data stored in the storage 9 may be downloaded from the other device via a communication performed by the communication unit 6. In FIG. 5, a part or all of the programs and data stored in the storage 9 may be stored in a reader-readable non-transitory storage medium included in the storage 9. In FIG. 5, a part or all of the programs and data stored in the storage 9 may be stored in a reader-readable non-transitory storage medium connected to the connector 14. The non-transitory storage medium includes, but not only limited to, an optical disc such as CD (trademark), DVD (trademark), and Blu-ray (trademark), a magneto-optical disk, a magnetic storage medium, a memory card, and a solid-state storage medium.

The configuration of the smartphone 1 shown in FIG. 5 is an example, and can be appropriately changed within a range of not impairing the scope of the present disclosure. For example, the number and the type of the button 3 are not limited to the example in FIG. 5. The smartphone 1 may comprise buttons of numeric keypad or QWERTY instead of the buttons 3A to 3C as the buttons for the operation regarding the screen. The smartphone 1 may comprise only one button for the operation regarding the screen or may not comprise the button. In the example shown in FIG. 5, the smartphone 1 comprises the two cameras, however, the smartphone 1 may comprise only one camera or may not comprise the camera. In the example shown in FIG. 5, the smartphone 1 comprises the three types of sensors to detect the position and the posture, however, the smartphone 1 may not comprise some of these sensors. Alternatively, the smartphone 1 may comprise the other type of sensor to detect at least one of the position and the posture.

Figure 6:
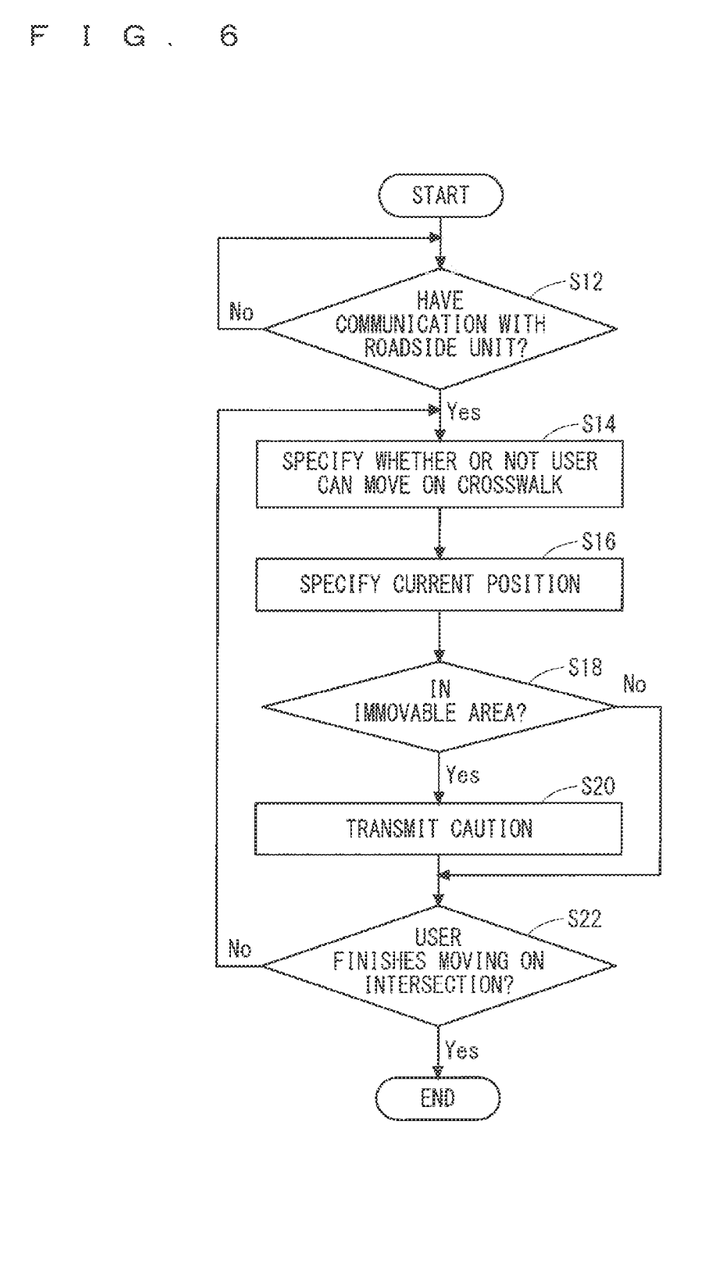
FIG. 6 illustrates a flow chart showing one example of control performed by the smartphone.
Figure 7:
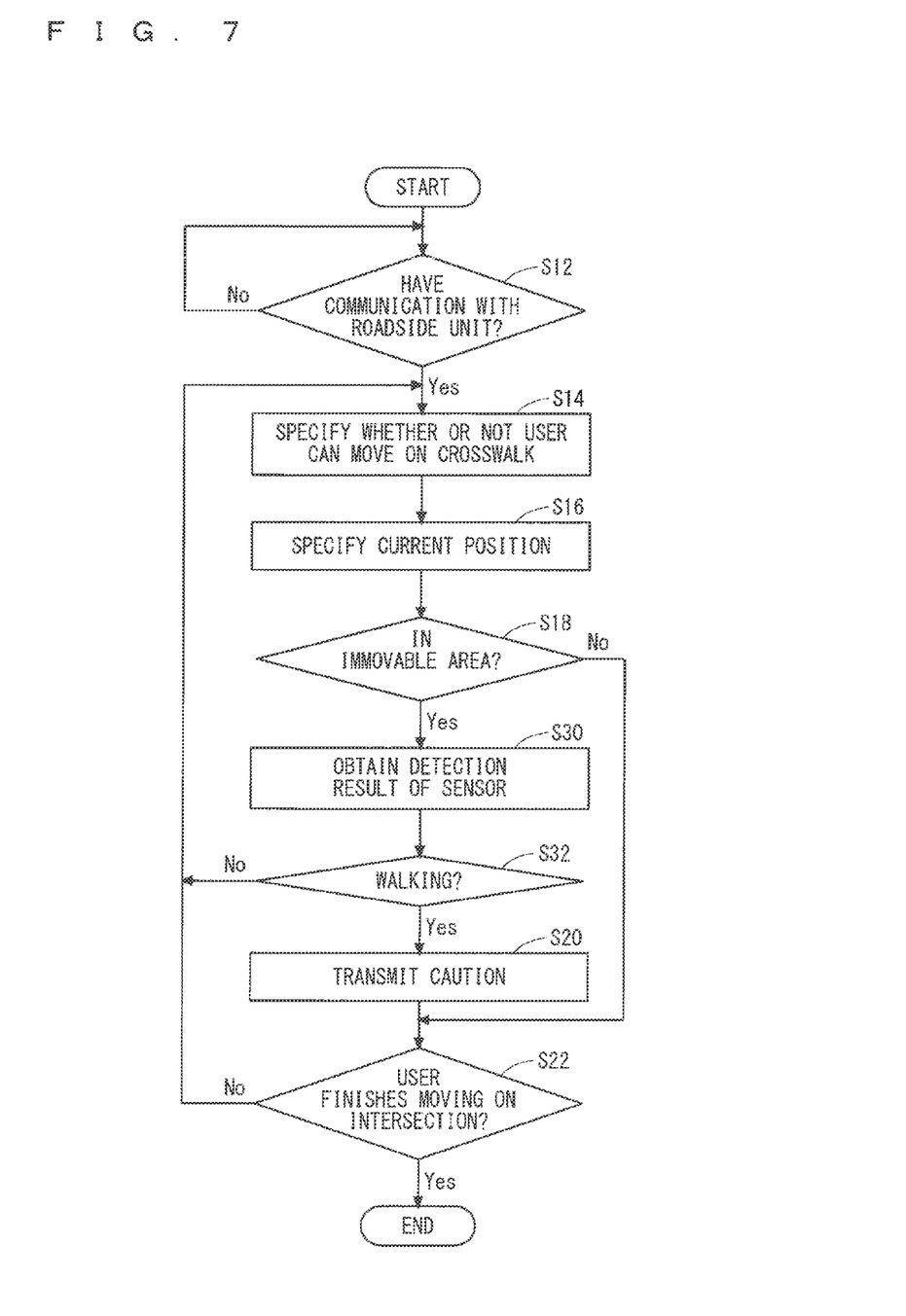
FIG. 7 illustrates a flow chart showing one example of control performed by the smartphone.

The control executed by the smartphone 1 is described next with reference to FIG. 6 and FIG. 7. FIG. 6 and FIG. 7 are flow charts each showing one example of control performed by the smartphone according to embodiments.

The processing executed by the smartphone 1 is described using FIG. 6. The smartphone 1 executes the control program 9A stored in the storage 9 using the controller 10, thereby being able to achieve the function shown in FIG. 6. The controller 10 may execute a processing procedure of the other function in parallel with a processing procedure shown in FIG. 6. The controller 10 may execute the processing shown in FIG. 6 repeatedly in a predetermined cycle, or may execute the processing with a change in a state as a trigger.

Firstly, the controller 10 determines whether the smartphone 1 has communication with a roadside unit as Step S12 (Step S12). If controller 10 determines that the smartphone 1 can communicate with a roadside unit, the controller 10 determines that there is the smartphone 1 near a road where a traffic light is disposed such as a crosswalk. If the controller 10 determines that the smartphone 1 does not have communication with the roadside unit (No in Step S12), the controller 10 returns the processing to Step S12. The controller 10 repeats the determination in Step S12 until the smartphone 1 moves to a region where the smartphone 1 can communicate with the roadside unit.

If the controller 10 determines that the smartphone 1 has communication with the roadside unit (Yes in Step S12), the controller 10 specifies whether or not the user of the smartphone 1 can move along the crosswalk (Step S14). Specifically, the controller 10 obtains information of a state of the traffic light corresponding to the crosswalk from the roadside unit, thereby specifying whether the crosswalk corresponding to the traffic light is in a state of being passable or impassable. Herein, the controller 10 may specify whether or not the user can move for all of the crosswalks in the intersection where the roadside unit is disposed, or may specify whether or not the user can move for only the crosswalk along which the user can move.

If the controller 10 specifies whether or not the user can move, the controller 10 specifies a current position of the smartphone 1, in other words, a current position of the user (Step S16). The controller 10 can specify the current position based on a signal received by the GPS receiver 24 (first information). The controller 10 communicates with the plurality of roadside units to obtain the information (the first information) and compare a communication state between the smartphone 1 and each roadside unit, thereby being able to specify which position in the intersection the smartphone 1 (the user) is located.

If the controller 10 specifies the current position, the controller 10 determines whether the user is located in an immovable area (Step S18). The immovable area is an area determined to be in a state where the user is prohibited from moving based on the information of the roadside unit. Applied as one example is a crosswalk with a red traffic light. If the controller 10 determines that the user is not located in the immovable area (No in Step S18), the controller 10 proceeds with the processing to Step S22.

If the controller 10 determines that the user is located in the immovable area (Yes in Step S18), the controller 10 transmits a notification of caution (Step S20). Various methods can be used as a notification method. For example, the controller 10 may output a sound from the speaker 11 to transmit the caution. The controller 10 may vibrate the housing 20 using the vibrator 22 to transmit the caution by vibration. If the controller 10 is in a state of making the display 2A display the image, the controller 10 may make the display 2A display a message indicating that the user is in the immovable area. The controller 10 may make the light emitting unit 23 emit light to transmit a notification with the light.

If the controller 10 transmits a notification in Step S20 or if it is determined to be No in Step S18, the controller 10 determines whether the user finishes moving along the intersection (Step S22). Herein, the determination whether the user finishes moving along the intersection is based on whether the communication between the smartphone 1 and the roadside unit determined to have communication in Step S12 is established or disconnected. If the communication between the smartphone 1 and the roadside unit is established, the controller 10 determines that the movement of the user along the intersection is not finished. If the communication between the smartphone 1 and the roadside unit is disconnected, the controller 10 determines that the movement of the user along the intersection is finished. If the controller 10 determines that the user does not finish moving along, the intersection (No in Step S22), the processing returns to Step S14, if the controller 10 determines that the user finishes moving along the intersection (Yes in Step S22), the controller 10 finishes the processing.

The smartphone 1 or the control system 100 switches presence and absence of output of the caution from the smartphone 1 based on information, obtained from the roadside unit, whether the user can cross the road, that is to say, based on obtained information of the traffic light 106 on each road, thereby being able to appropriately transmit the caution to the user crossing the impassable road. If the notification of the caution is performed with sound or light, the notification indicating that the user is in the immovable area can be transmitted to the surrounding area. As a result, a person in the surrounding area recognizes the user, and can contact the user to move outside the Unmovable area. Accordingly, the user can immediately move from a dangerous location. If the information is obtained from the roadside unit, the information whether or not the user can move along the crosswalk in the intersection can be obtained easily. Suppressed accordingly is a notification of a caution during crossing the passable crosswalk, and appropriate caution information can be transmitted.

In one embodiment, the notification is transmitted to the user if the user is in the immovable area, however, the smartphone 1 may transmit the notification to the other communication device via communication. Accordingly, the user of the smartphone 1 can notify an administrator managing a behavior of the user of a state of the user, thus the administrator can send attention to the user. The other communication device includes a communication device provided in a vehicle. A driver of a vehicle to which the state of the user is transmitted can give attention to the behavior of the user. If the vehicle automatically travels, the vehicle can perform safety control based on the state of the user which has been transmitted.

The intersection is described as an example in one embodiment, however, a crosswalk on a road which does not intersect with the other road may also be applicable.

Another example of the control performed by the smartphone 1 or the control system 100 is described using FIG. 7 next. The processing shown in FIG. 7 is similar to the processing shown in FIG. 6 except for the processing in the case where it is determined to be Yes in Step S18. Particular processing in the flow chart shown in FIG. 7 is described in an emphasized manner.

Firstly, the controller 10 determines whether the smartphone 1 has communication with a roadside unit as Step S12 (Step S12). If the controller 10 determines that the smartphone 1 does not have communication with the roadside unit (No in Step S12), the controller 10 returns the processing to Step S12. The controller 10 repeats the determination in Step S12 until the smartphone 1 moves to a region where the smartphone 1 can communicate with the roadside unit.

If the controller 10 determines that the smartphone 1 has communication with the roadside unit (Yes in Step S12), the controller 10 specifies whether or not the user of the smartphone 1 can move along the crosswalk (Step S14). If the controller 10 specifies whether or not the user can move, the controller 10 specifies a current position of the smartphone 1, in other words, a current position of the user (Step S16). If the controller 10 specifies the current position, the controller 10 determines whether the user is located in an immovable area (Step S18), Applied as one example is a crosswalk with a red traffic light. If the controller 10 determines that the user is not located in the immovable area (No in Step S18), the controller 10 proceeds with the processing to Step S22.

If the controller 10 determines that the user is located in the immovable area (Yes in Step S18), the controller 10 obtains a detection result (second information) (Step S30). Specifically, the controller 10 obtains a detection result of at least one of the accelerometer 15, the magnetic sensor 18, and the gyroscope 17 and a detection result of at least one of the communication unit 6 and the GPS receiver 24. The detection result of at least one of the accelerometer 15, the magnetic sensor 18, and the gyroscope 17 is used for determining the movement state and used for determining whether or not the user walks. The detection result of at least one of the communication unit 6 and the GPS receiver 24 is used for determining whether or not the user having the smartphone 1 is located in a predetermined region.

After obtaining the detection result of the sensor, the controller 10 determines whether the user walks (Step S32). Specifically, the controller 10 compares the detection result of the accelerometer 15, the magnetic sensor 18, and the gyroscope 17 with the movement state data 9C, and determines whether the user walks based on the comparison result. Herein, the state where the user does not walk includes a state where the user stands still and a state where the user moves using the other moving means such as a bicycle, a motorcycle, a car, a train, amphibian car, a ship, and an airplane, for example. The state where the user walks includes various cases where the movement is performed by foot of the user. The state where the movement is performed by foot of the user indicates a state where the user independently moves with the smartphone 1 or a state where the user moves without riding a vehicle supporting the movement. The state where the movement is performed by foot of the user includes at least one of a state of walking, that is to say, the user is walking and running, that is to say, the user is running. The state where the movement is performed by foot of the user includes a state where the user does not move by foot of the user but stands still. The state where the movement is performed by foot of the user also includes a state here the user walks using a walking stick or a cart, for example.

If the controller 10 determines that the user does not walk (No in Step S32), the controller 10 returns the processing to Step S14. If the controller 10 determines that the user walks (Yes in Step S32), the controller 10 transmits the caution (Step S20).

If the controller 10 transmits a notification in Step S20 or if it is determined to be No in Step S18, the controller 10 determines whether the user finishes moving along the intersection (Step S22). If the communication between the smartphone 1 and the roadside unit is disconnected, the controller 10 determines that the movement of the user along the intersection is finished. If the controller 10 determines that the user does not finish moving along the intersection (No in Step S22), the processing returns to Step S14. If the controller 10 determines that the user finishes moving along the intersection (Yes in Step S22), the controller 10 finishes the processing.

As described above, if the smartphone 1 detects that the user is located in the immovable area in the intersection and walks, the smartphone 1 transmits the caution, thereby being able to notify the user that the user is in a dangerous state. If the user walks, that is to say, if the user moves, the smartphone 1 transmits the caution, thereby being able to suppress an output of the caution to the user waiting for a traffic light near the intersection.

In the processing shown in FIG. 7, if the user is located in the immovable area and does not walk, the smartphone 1 does not transmit the caution, however, the smartphone 1 may transmit a notification different from the caution. Accordingly, the smartphone 1 can transmit, to the surrounding area, the notification that user enters the immovable state for some reason during moving in the immovable area. In this case, it is also applicable that the smartphone 1 outputs information to the roadside unit 104 to control the display of the traffic light by the roadside unit 104, thereby switching the state of the crosswalk on which the user of the smartphone 1 is located to the passable state so that the vehicle cannot pass across the crosswalk.

In the embodiment described above, the smartphone is described as the example of the mobile electronic device, however, the mobile electronic device is not limited to the smartphone. The mobile electronic device may be a device other than a smartphone. The mobile electronic device needs to comprise the display, the operation unit, and the communication unit having communication with the other device, and includes, for example, a mobile phone, a tablet, a portable personal computer, a digital camera, a media player, an electronic book reader, a navigator, and a game machine, but is not limited thereto.

The art of appended claims has been described with respect to the plurality of embodiments for a clear disclosure. However, the appended claims are not to be thus limited but are to be construed as embodying all modifications and alternative constructions that may occur to one skilled in the art which fairly fall within the basic teaching herein set forth.

The invention claimed is:

1. A mobile electronic device, comprising
at least one processor configured to obtain first information and signal information that is transmitted from a roadside unit via short-range wireless communication, and
specify a position of a user based on the first information, and upon determining that the user is located in a region through which the user is prohibited from passing based on the position of the user and signal information, execute processing for transmitting a notification of a state of the user and transmitting second information to the roadside unit, the second information being configured to change a signaling state of a crosswalk controlled by the roadside unit, wherein
in response to the processor determining the user is in the prohibited region, the processor determines if the user is moving by foot based on a comparison with another measurement sensor, and
in response to the processor determining that the user moves by foot, the processor transmits the notification as a warning, or
in response to the processor determining that the user does not move by foot, then the processor does not transmit the notification as a warning.

2. The mobile electronic device according to claim 1, wherein
the notification is provided to the user via a user interface of the mobile electronic device.

3. The mobile electronic device according to claim 1, wherein
the notification is transmitted to another communication device.

4. The mobile electronic device according to claim 1, wherein
the first information is information from a plurality of roadside units provided in one intersection.

5. A control system, comprising:
the mobile electronic device according to claim 1; and
the roadside unit configured to output the signal information of the position of the user to the mobile electronic device.

6. A control method of controlling a mobile electronic device, comprising:
obtaining first information and obtaining signal information via short-range wireless communication with a roadside unit; and
specifying a position of a user based on the first information, and upon determining that the user is located in a region through which the user is prohibited from passing based on the position of the user and the signal information, executing processing for transmitting a notification of a state of the user and transmitting second information to the roadside unit, the second information being configured to change a signaling state of a crosswalk controlled by the roadside unit, wherein
in response to determining the user is in the prohibited region, determining if the user is moving by foot based on a comparison with another measurement sensor, and
in response to determining that the user moves by foot, transmitting the notification as a warning, or
in response to determining that the user does not move by foot, not transmitting the notification as a warning.

7. A non-transitory computer readable storage medium that stores a control program in a mobile electronic device to execute processes of:
obtaining a plurality of pieces of first information, each transmitted from a plurality of roadside units provided in one intersection, and obtaining signal information via short-range wireless communication with a roadside unit;
specifying a position of a user based on the plurality of pieces of first information, and upon determining that the user is located in a region through which the user is prohibited from passing based on the position of the user and the signal information, executing processing for transmitting a notification of a state of the user;
in response to determining the user is in the prohibited region, determining if the user is moving by foot based on a comparison with another measurement sensor; and
in response to determining that the user moves by foot, transmitting the notification as a warning, or
in response to determining that the user does not move by foot, not transmitting the notification as a warning.

8. The mobile electronic device according to claim 1, wherein
in response to the processor determining that the user does not move by foot, the processor transmits another notification that is different from the warning.

9. The control method of controlling a mobile electronic device according to claim 6, further comprising:
in response to determining that the user does not move by foot, transmitting another notification that is different from the warning.

10. The non-transitory computer readable storage medium that stores a control program in a mobile electronic device according to claim 7, further comprising a process of:

in response to determining that the user does not move by foot, transmitting another notification that is different from the warning.

* * * * *